(12) United States Patent
Osborne et al.

(10) Patent No.: US 7,950,527 B2
(45) Date of Patent: May 31, 2011

(54) HELICAL INTERNAL SUPPORT STRUCTURE FOR INTAKE SCREENS

(75) Inventors: Jay R. Osborne, Ham Lake, MN (US); Michael Ekholm, Minneapolis, MN (US); Dan Ganfield, Ramsey, MN (US)

(73) Assignee: Weatherford/Lamb, Inc., Houston, TX (US)

( * ) Notice: Subject to any disclaimer, the term of this patent is extended or adjusted under 35 U.S.C. 154(b) by 1475 days.

(21) Appl. No.: 11/345,155

(22) Filed: Feb. 1, 2006

(65) Prior Publication Data

US 2007/0175834 A1  Aug. 2, 2007

(51) Int. Cl.
*E02B 5/16* (2006.01)

(52) U.S. Cl. ........... 210/483; 210/172.3; 210/172.4; 210/456; 210/460; 210/499

(58) Field of Classification Search ........... None
See application file for complete search history.

(56) References Cited

U.S. PATENT DOCUMENTS

| | | | | |
|---|---|---|---|---|
| 415,927 | A | | 11/1889 | Stiles |
| 602,488 | A | * | 4/1898 | Tice .................. 210/315 |
| 705,364 | A | | 7/1902 | Kurtz |
| 866,560 | A | * | 9/1907 | Basye .................. 166/231 |
| 1,274,121 | A | | 7/1918 | White |
| 2,014,105 | A | * | 9/1935 | Dooley ................ 210/446 |
| 2,249,020 | A | | 7/1941 | McFarlin |
| 2,346,885 | A | | 4/1944 | Williams et al. |
| 2,572,173 | A | | 10/1951 | McFarlin |
| 2,754,003 | A | * | 7/1956 | Fenner .................. 210/134 |
| 2,957,579 | A | | 10/1960 | McCombie |
| 3,037,636 | A | | 6/1962 | McFarlin |
| 3,561,605 | A | * | 2/1971 | Likness ................. 210/497.1 |
| 3,643,802 | A | * | 2/1972 | Jackson, Jr. ........... 210/172.3 |
| 3,826,372 | A | * | 7/1974 | Bell ..................... 210/172.4 |
| 4,261,822 | A | | 4/1981 | Richardson |
| 4,411,788 | A | * | 10/1983 | Kimura .................. 210/439 |
| 4,618,422 | A | * | 10/1986 | Sasaki et al. ........... 210/172.3 |
| 4,743,370 | A | | 5/1988 | Mizusawa ............. 210/460 |
| 4,822,486 | A | | 4/1989 | Wilkins et al. |
| 4,874,510 | A | * | 10/1989 | Akira et al. ............ 210/172.4 |
| 5,230,131 | A | * | 7/1993 | Hobson, Jr. ........... 29/402.06 |
| 5,327,848 | A | | 7/1994 | Hannon, Jr. |
| 5,407,570 | A | * | 4/1995 | Hobson, Jr. ........... 210/232 |
| 6,051,131 | A | * | 4/2000 | Maxson ................. 210/162 |
| 6,066,253 | A | | 5/2000 | Idland et al. |
| 6,682,651 | B1 | * | 1/2004 | Toland et al. .......... 210/155 |

(Continued)

FOREIGN PATENT DOCUMENTS

CA   2090686   1/1993

(Continued)

OTHER PUBLICATIONS

CA Office Action, Application No. 2,574,255, dated Apr. 22, 2009.
EP Search Report, Application No. 07100728.0, Dated Jun. 1, 2007.

*Primary Examiner* — Robert James Popovics
(74) *Attorney, Agent, or Firm* — Patterson & Sheridan, L.L.P.

(57) ABSTRACT

A method and apparatus for supporting a screen. The apparatus comprising a cylindrical screen for submerging in a fluid, the screen having an inlet pipe for connecting to a piping system, filter members, a first end, a second and a support structure. The support structure is one or more helical members which traverse the screen.

13 Claims, 3 Drawing Sheets

U.S. PATENT DOCUMENTS

| | | | |
|---|---|---|---|
| 6,712,959 B2 * | 3/2004 | Ekholm et al. | 210/162 |
| 6,949,198 B2 * | 9/2005 | Reber | 210/747 |
| 7,273,545 B1 * | 9/2007 | Lloyd | 210/162 |
| 7,575,677 B1 * | 8/2009 | Barnes | 210/232 |
| 2003/0029780 A1 | 2/2003 | Ekholm et al. | |
| 2007/0175834 A1 * | 8/2007 | Osborne et al. | 210/767 |
| 2008/0061010 A1 * | 3/2008 | Tom | 210/767 |

FOREIGN PATENT DOCUMENTS

| | | |
|---|---|---|
| EP | 0 228 262 | 7/1987 |
| GB | 2 075 364 | 11/1981 |
| JP | 04 190807 | 7/1992 |
| WO | WO 03/091536 | 11/2003 |

* cited by examiner

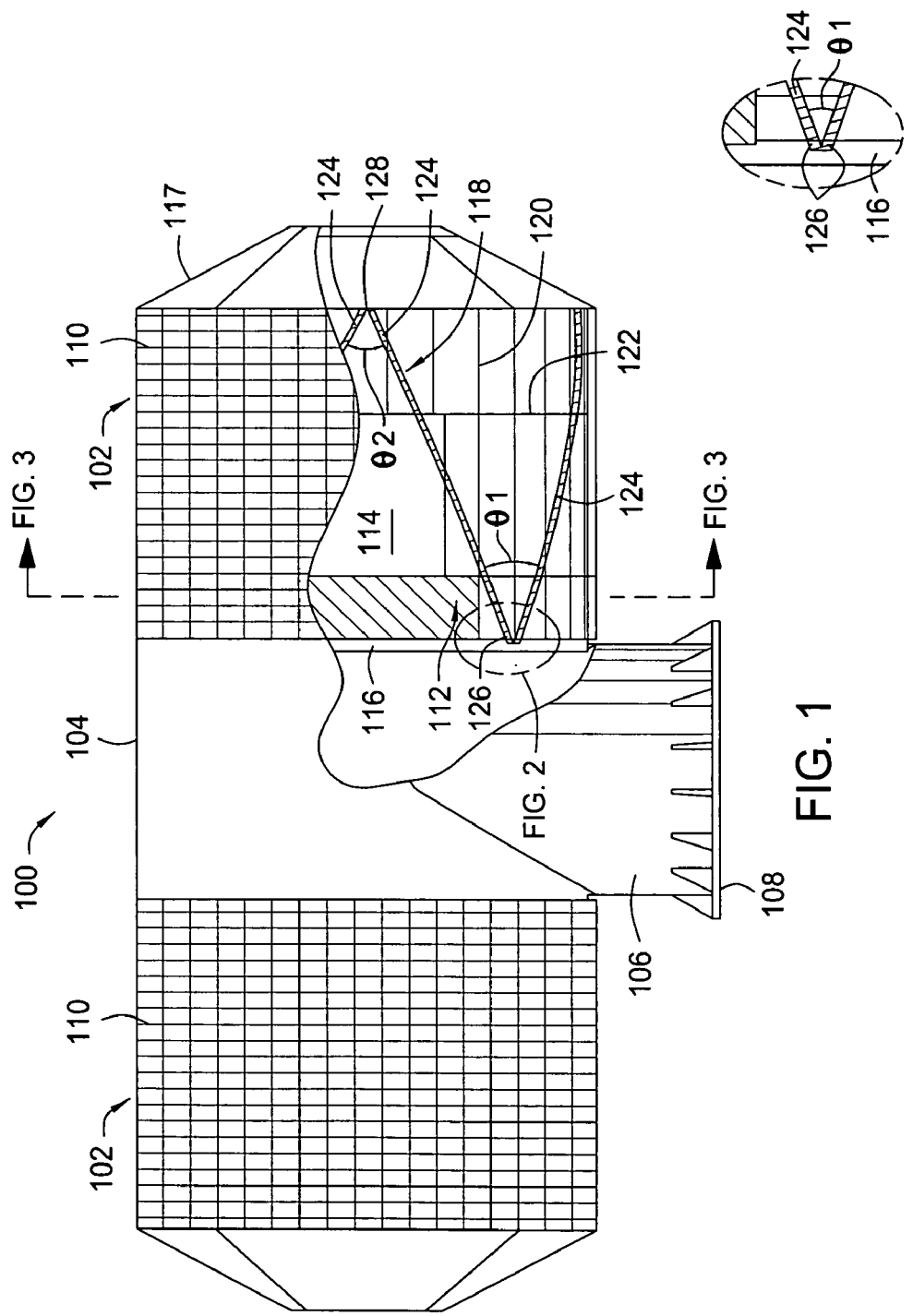

HELICAL INTERNAL SUPPORT STRUCTURE FOR INTAKE SCREENS

BACKGROUND OF THE INVENTION

1. Field of the Invention

Embodiments of the present invention generally relate to a submerged intake screen. More particularly, embodiments of the present invention relate to a screen having a support structure. More particularly still, the present invention relates to a screen having a helical support structure.

2. Description of the Related Art

Water collection systems are typically used to provide water to end users such as manufacturing plants, cities, irrigation systems, and power generation facilities located adjacent a body of water such as a river, lake, or salt water bodies. The end users may employ this type of system as an alternative to drilling water well or buying water from a municipality. Additionally, use of these systems may be determined by the location of the end user, for example remote locations where water from a municipal source and/or electrical power to operate pumps is not readily available. These water collection systems have the ability to adapt to varying conditions and deliver water efficiently and economically.

These water collection systems typically use an inlet pipe adapted to transport water from a position submerged in the body of water to the end user adjacent the body of water. An inlet pipe is submerged in the body of water and the end of the inlet pipe is typically coupled to an intake screen which typically has a plurality of filtering members, such as ribs, mesh, or perforations disposed on its outer surface. The filtering members are configured to prevent waterborne debris and aquatic life, of a certain size, from entering the inlet pipe.

Conventional intake filter assemblies typically include an inlet pipe having an open end surrounded by and coupled to a cylindrical screen, which has a central axis that is the same as a longitudinal axis of the inlet pipe. In this way, the cylindrical screen is concentric with the inlet end of the inlet pipe. A typical intake filter assembly may also include a flow modifier pipe within the inlet pipe and extending beyond the inlet pipe into the cylindrical screen. The flow modifier pipe helps evenly distribute the flow of water through the cylindrical screen over the length of the screen.

The flow modifier pipes used now have allowed the overall length of the intake filter to increase while maintaining the intake flow rate below the maximum levels allowed. The increased length of the intake filter has caused structural problems with the intake filter. Previously the intake filters were simply welded to an end cap and a plate connected to the inlet pipe. However, the filter itself is not sufficiently strong enough to support intake and current loads when the length is increased. Attempts have been made to correct this problem using longitudinal support bars in conjunction with optional hoops which follow the filter. However, in order to brace the filter sufficiently a large number of support bars and hoops are required, increasing the overall cost and complexity of each intake filter.

Therefore, a need exist for an intake filter having a support structure which is efficient and inexpensive to build, while maximizing the strength of the filter.

SUMMARY OF THE INVENTION

The present invention generally relates to a submerged filter assembly having a cylindrical screen and a support structure. The cylindrical screen has an inner diameter, a first end and a second end. The support structure supports the cylindrical screen and is configured in a substantially non-longitudinal manner in relation to the screen.

The present invention further relates to a method of filtering a medium by submerging an intake filter assembly having a cylindrical screen couplable to a piping system, a primary flow modifier, and a support structure having helical members which support the screen. Thereafter, the medium is flowed past the filter assembly and into the piping system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a front view of a filter assembly with a cut away portion according to an embodiment of the present invention.

FIG. 2 is a detail of a support structure connection according to an embodiment of the present invention.

DETAILED DESCRIPTION

Figure 3:
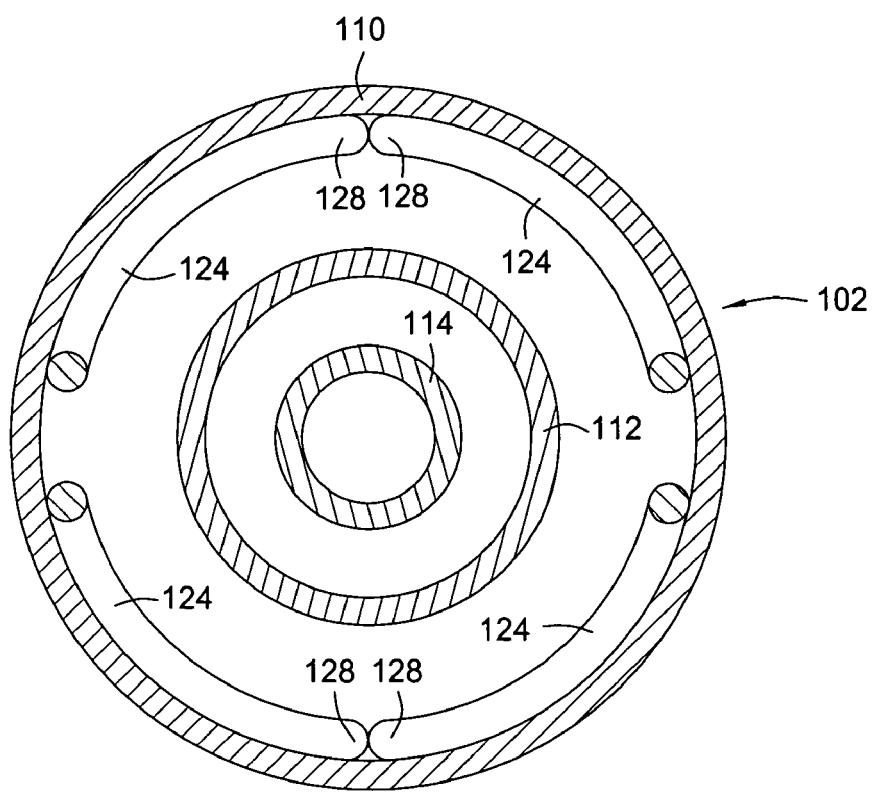
FIG. 3 is an cross-sectional end view of a screen and support structure according to one embodiment of the present invention.

FIG. 1 is a front view of a submerged intake filter assembly 100 according to one embodiment of the present invention. The submerged intake screen includes two cylindrical screens 102 coupled together by a connector pipe 104 which is couple to an inlet pipe 106. The inlet pipe 106 optionally has a flange 108 for easily coupling the screen 100 to a piping system (not shown), for carrying the water to a facility for use. The screens 102 include a series of filter members 110 which run substantially parallel around the circumference of the screen 102. Although shown as running substantially parallel around the screen 102, it should be appreciated that the filter members 110 could be arranged in any manner that blocks debris from entering the screen 102.

The intake filter assembly 100 is shown, in FIG. 1, with a portion of the filter members 110 cut away. The cut away portion shows the interior of the screen having a primary flow modifier 112, a secondary flow modifier 114, a plate 116 which connects the connector pipe 104 to the modifiers 112 and 114, an end cap 117, and a support structure 118. The cut away portion also shows longitudinal supports 120 and circumferential supports 122, which provide basic support for the screen 102 while holding the filter members 110 in place. Although shown as having longitudinal supports and circumferential supports it should be appreciated that the invention could be practiced with only the longitudinal supports 122.

The support structure 118, as shown, consists of a series of helical bars 124 which traverse the screen 102. In one embodiment, a first end 126 of two bars 124 couples to the plate 116 at substantially the same location. The bars 124 then extend toward the end cap 117 in a manner that creates an angle θ1 between the two bars 124, as shown in FIGS. 1 and 2. The bars 124 are arranged to have the same contour as the screen 102 as the bar traverses the screen 102. Thus, the bars 124 are in contact with the screen 102 as the bar extends from the first end of the bar 126 to a second end 128 of the bar. The second end 128 of the bar couples to the cap 117. The bars 124 may be coupled to the plate 116 and the cap 117 by any method known in the art, such as welding, screws, bolts, etc. In one embodiment, the bars 124 at the second end 128 are coupled with a substantially similar angle θ2 as the angle θ1 on the first end. With the bars 124 coupled to the plate 116 and the cap 117 at substantially the same location, the bars form a zigzag pattern as they traverse the screen. Although shown as each end of the bars 124 being coupled together at the plate 116 and the cap 117 it should be appreciated that any arrangement could be used so long as the bars 124 traverse the screen 102 in a substantially helical manner.

The angles θ1 and θ2 can be any angle necessary for the operation. The larger the angle, the longer the bars 124 will need to be in order to traverse a longer section of the screen 102. Further, any number of angles θ1 and θ2 could be used, for example angles θ1 and/or θ2 could vary for each new set of bars 124.

FIG. 3 shows a cross sectional view of the filter assembly 100 according to one embodiment of the present invention. The bars 124 are shown coupled to the interior of the screen 102 and the filter members 110. Although shown as the bars 124 being coupled to the interior of the screen 102, it should be appreciated that the bars 124 may be adapted to couple to the exterior of the screen 102 or be included as an integral part of the screen 102, or coupled to the longitudinal supports 120 or the circumferential supports 122. These longitudinal supports 120 and circumferential supports 122 could be integral with the screen 102, or on the interior or exterior diameter of the screen 102, or any combination thereof. The bars 124 are shown extending from a point just after the first end 126, shown in FIGS. 1 and 2, to the second end 128 where the bars 124 are coupled to the cap 117. The bars 124 may be coupled to the screen 102 by known methods such as welding, screws, bolt, etc. or may simply rest against screen 102. The bars 124 provide extra stiffness for the screen 102 to resist lateral current and intake loads. Further, although the bars 124 are shown as helical members it, should be appreciated that any non-longitudinal arrangement of bars may be used.

The bars 124 are shown, in FIG. 3, as being solid cylindrical members, but could just as effectively be tubular or any long member having a polygonal cross-section, an angle iron, a channel, etc.

Figure 4:
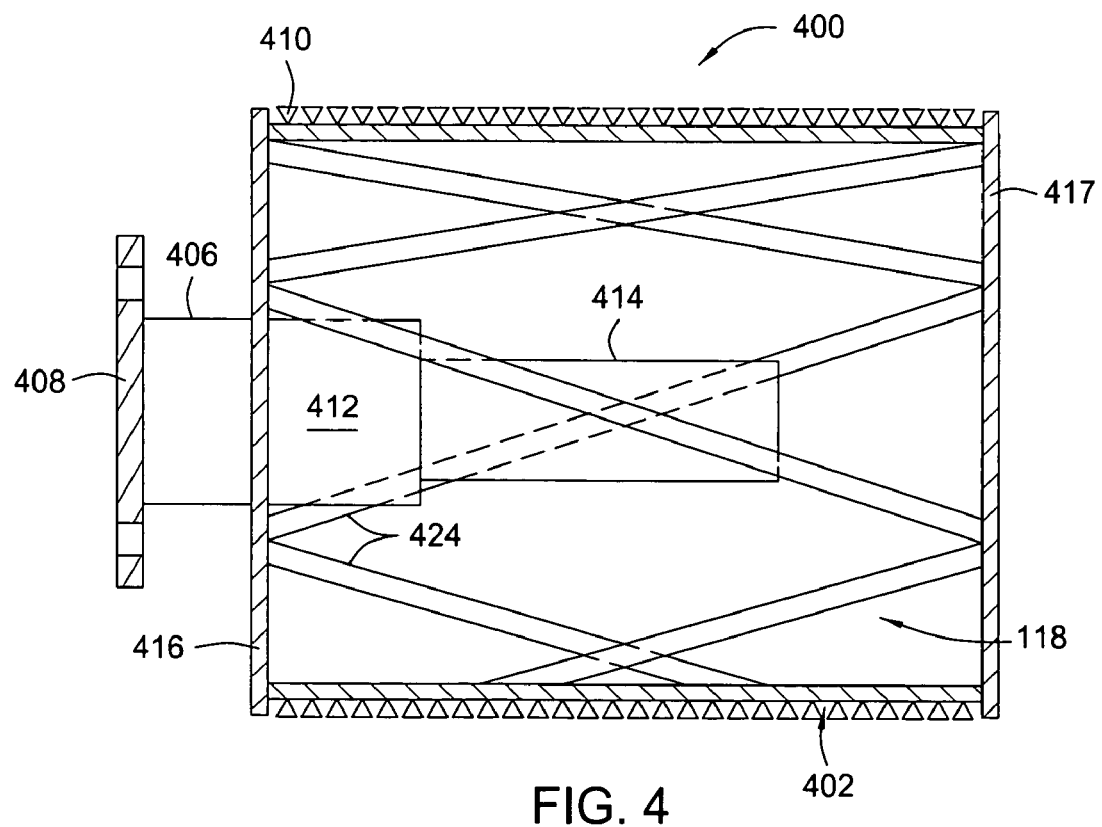
FIG. 4 is a front view of a filter assembly according to an embodiment of the present invention.

FIG. 4 shows another embodiment of a filter assembly 400, with the filter members 410 shown only cross-sectionally for clarity, having the same support structure 118 as described above. The filter assembly 400 has only one screen 402 with an inlet pipe 406 coupled to a plate 416. The plate 416 couples to the screen 402, which couples to a cap 417. The inlet pipe 406 as above has an optional flange 408 for attaching the filter assembly to a piping system not shown. The filter assembly 400 has a primary flow modifier 412, a secondary flow modifier 414.

Figure 5:
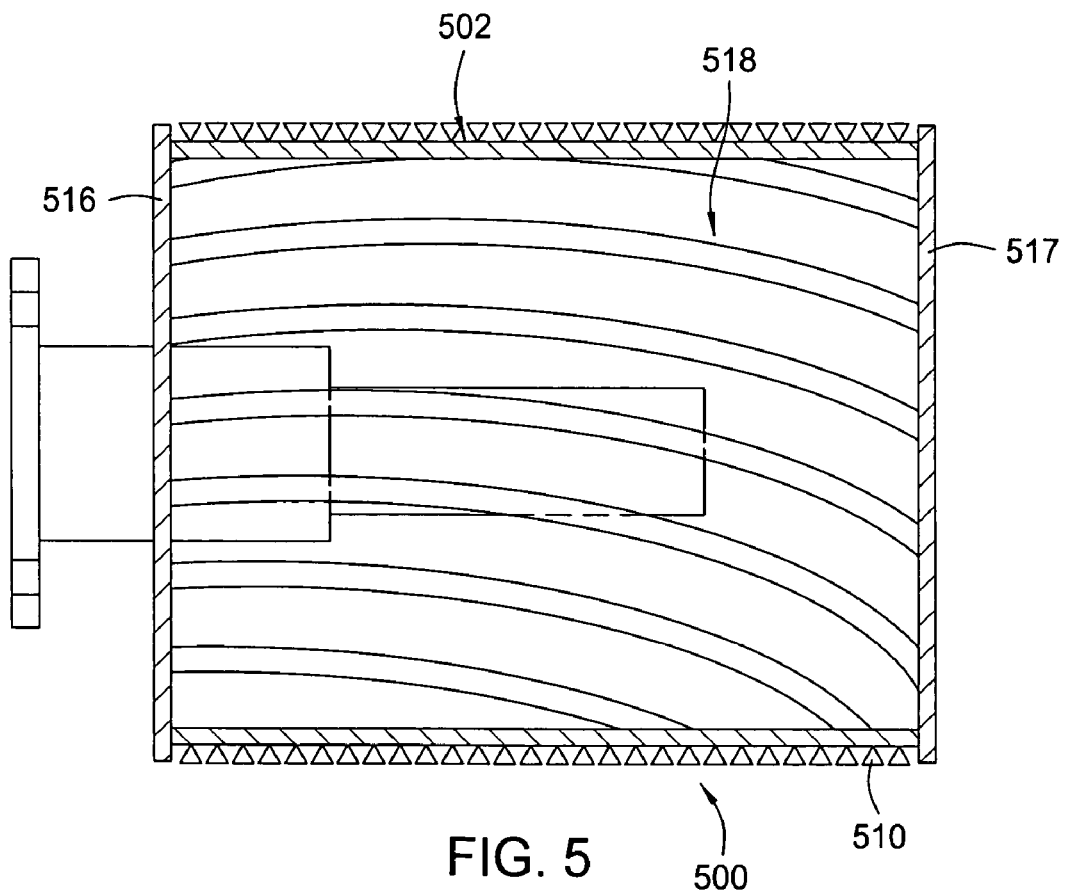
FIG. 5 is a front view of a filter assembly according to an embodiment of the present invention.

FIG. 5 shows an alternative embodiment of the filter assembly 500. The filter assembly 500 is substantially the same as the embodiments above, however, the support structure 518 consists of a series of helical bars 524 which as above follow the screen 502 but do not meet an the plate 516 and the cap 517.

Each of the filter assemblies above is shown, for simplicity as having a primary flow modifier and a secondary flow modifier. It should be appreciated, however, that any number of flow modifiers and any arrangement contemplated in the art may be used for the modifiers. Examples of cylindrical screens with flow modifiers are shown in U.S. Pat. No. 6,051,131 to Maxson, and U.S. Pat. No. 6,712,959 to Ekholm, et al., the disclosures of which is incorporated by reference herein.

Further, it is contemplated, in an alternative embodiment, that the support bars 124 run in a non-longitudinal straight line from the plate 116 to the cap 117. Thus, two or more bars 124, would attach to the plate 116 and the cap 117 at different longitudinal locations and act as cross-bracing for the screen 102.

While the foregoing is directed to embodiments of the present invention, other and further embodiments of the invention may be devised without departing from the basic scope thereof, and the scope thereof is determined by the claims that follow.

The invention claimed is:

1. A submerged filter assembly comprising:
    a cylindrical screen having an inner diameter, a first end and a second end; and
    a support structure for supporting the cylindrical screen located on the inner diameter of the screen, wherein the support structure is configured in a substantially helical configuration and wherein the support structure consists of two or more bars extending from the first end to the second end and following the inner diameter of the screen and at least two of the bars extend from the first and second end at a joint such that the bars form a zig-zag pattern as the bars helically traverse the screen.

2. The screen of claim 1, further comprising a primary flow modifier having an outer diameter less than the inner diameter of the cylindrical screen locatable inside the cylindrical screen.

3. The screen of claim 2, further comprising a secondary flow modifier extending into the interior of the cylindrical screen.

4. The screen of claim 1, wherein the second end comprises a cap.

5. A submerged intake screen comprising:
    a cylindrical screen having a screen longitudinal axis, a first end, and a second end, the cylindrical screen defining an interior between the first end and the second end;
    a primary flow modifier pipe having a diameter less than that of the cylindrical screen and a primary longitudinal axis parallel to the screen longitudinal axis, the primary flow modifier pipe extending into the interior of the cylindrical screen through the first end of the cylindrical screen, thereby forming an annular space between the primary flow modifier pipe and the cylindrical screen; and
    a support structure for supporting the screen, the support structure comprising two or more bars extending from the first end to the second end in a helical configuration and at least two of the bars extend from the first and second end at a joint such that the bars form a zig-zag pattern as the bars helically traverse the screen.

6. The submerged intake filter assembly of claim 5, further comprising a secondary flow modifier pipe positioned in the annular space and extending into the interior of the cylindrical screen.

7. The submerged intake filter assembly of claim 6, wherein the secondary flow modifier pipe defines a secondary longitudinal axis that is at an angle to the primary longitudinal axis.

8. The submerged intake filter assembly of claim 6, further comprising a second secondary flow modifier pipe positioned in the annular space and extending into the interior of the cylindrical screen, the second secondary flow modifier pipe extending into the screen interior a different distance than the secondary flow modifier pipe.

9. The submerged intake filter assembly of claim 6, wherein the primary flow modifier pipe includes a primary inlet end and the secondary flow modifier pipe includes a secondary inlet end and the secondary inlet end extends further into the interior of the cylindrical screen than does the primary inlet end.

10. The submerged intake filter assembly of claim 9, further comprising a second secondary flow modifier pipe positioned in the annular space and extending into the interior of the cylindrical screen, the second secondary flow modifier pipe extending into the screen interior a different distance from the secondary flow modifier pipe.

11. The submerged intake filter assembly of claim 6, wherein the primary flow modifier pipe includes a primary inlet end and the secondary flow modifier pipe includes a secondary inlet end and the primary inlet end extends further into the interior of the cylindrical screen than does the secondary inlet end.

12. The submerged intake filter assembly of claim 5, wherein the bars extend from the first end to the second end on the interior of the screen.

13. The submerged intake filter assembly of claim 5, wherein the bars extend from the first end to the second end on the exterior of the screen.

* * * * *